Sept. 8, 1931. V. L. OESTNAES 1,822,451
MOLD FOR MOLDING CENTRAL TRIPLE REFLECTORS
Filed June 11, 1927
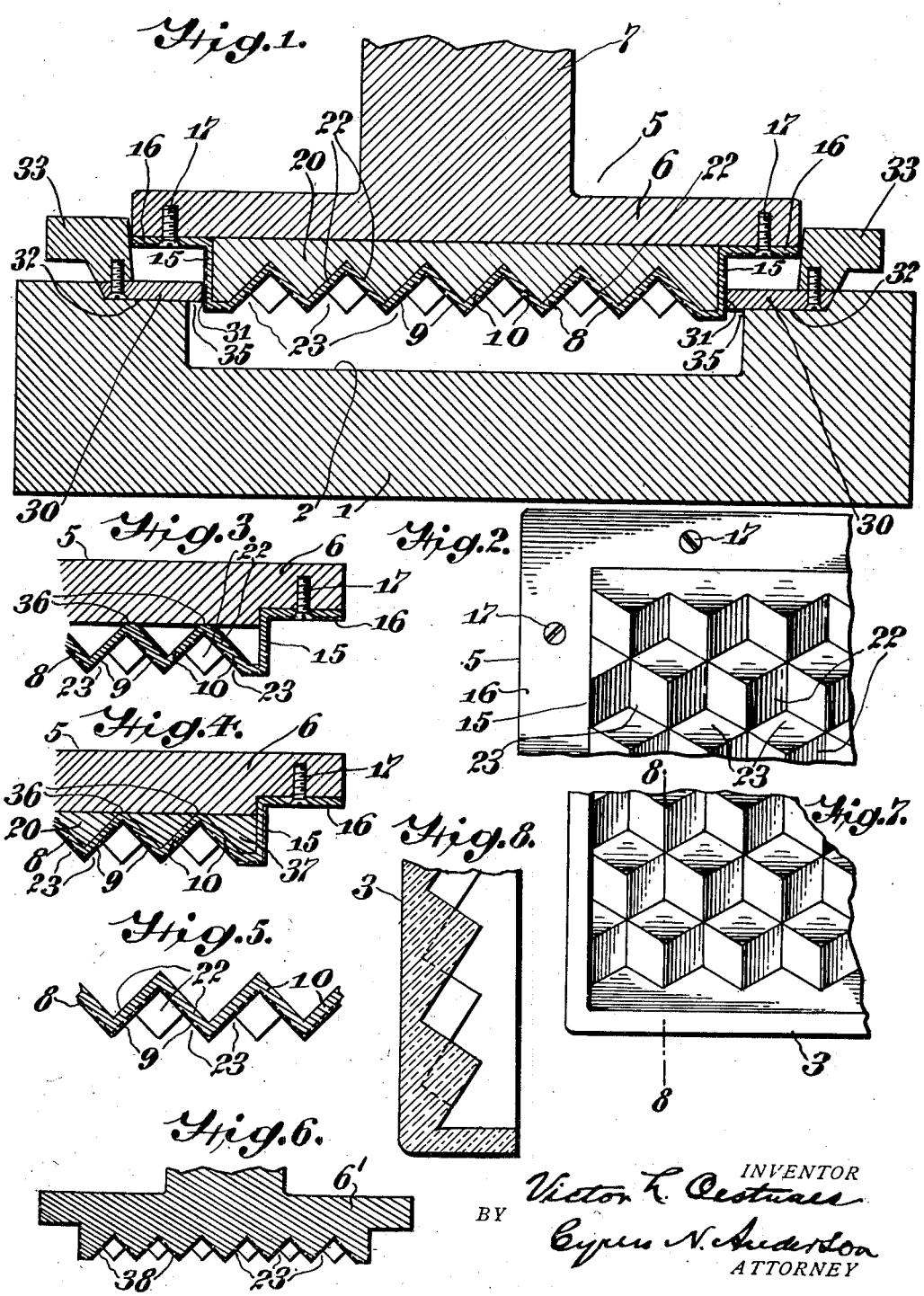

Patented Sept. 8, 1931

1,822,451

UNITED STATES PATENT OFFICE

VICTOR L. OESTNAES, OF WESTFIELD, NEW JERSEY, ASSIGNOR TO AMERICAN GASACCUMULATOR COMPANY, OF ELIZABETH, NEW JERSEY, A CORPORATION OF NEW JERSEY

MOLD FOR MOLDING CENTRAL TRIPLE REFLECTORS

Application filed June 11, 1927. Serial No. 198,070.

My invention relates to molds for use in the manufacture of central triple reflectors of glass.

In the manufacture of reflectors of this character of glass the principal difficulty is encountered in connection with the production of the molds for molding the same.

If molds of iron or steel be employed the molding surfaces are oxidized as a result of the contact thereof with the heated mass of glass and thereby become roughened. The molds are thus rendered unusable or useless except they be repolished; and when such molds are employed it is necessary that the molding or shaping surfaces thereof shall be repolished and resurfaced from time to time, because unless the surfaces of the trihedral projections which are formed upon one side of a sheet of glass by the molding process are smooth and in true right angular relation to each other the proper reflection of light by the reflector will not be effected. In reflectors of this character the rays of light which impinge upon the reflector from points within a certain critical angle are reflected in directions substantially parallel with the incident rays. The principle of reflection as effected by central triple reflectors is well understood and therefore will not be described in detail here.

The formation of pits or matrices in a block of iron or steel to constitute one member of a mold for molding masses of heated plastic glass may be effected manually, but the process is a tedious one. However, if after having been thus formed such a mold member might be used indefinitely without the necessity of repolishing and resurfacing the right angularly related surfaces of the respective pits or matrices it would be entirely feasible commercially to construct such molds manually; but owing to the oxidizing effect of heated plastic glass thereon, as previously suggested, that is not the case.

The general object of the present invention is to provide a mold in which the surface portion of the member thereof which is provided with pits or matrices for the formation of trihedral projections upon one side of a plate of glass consists of a metal which does not become oxidized by the contact of heated plastic glass thereagainst in the molding operation.

It also is an object of the invention to provide a mold in which the member thereof which is adapted to form, in the molding operation, trihedral projections upon one side of a molded sheet of glass is of novel but simple construction and comprises a sheet of metal non-oxidizable by the contact therewith of plastic heated glass, in which the molding pits or matrices are formed.

Other objects and advantages of the invention will be pointed out in the detailed description thereof which follows or will be apparent from such description.

In order that the invention may be readily understood and its practical advantages fully appreciated, reference may be had to the accompanying drawings in which I have illustrated certain forms of constructions embodying the same.

In the drawings:

Fig. 1 is a view in central section of a mold embodying the invention;

Fig. 2 is a view in bottom or face plan of a fragmentary portion of the top member of the mold shown in Fig. 1;

Fig. 3 is a view in transverse section of a fragmentary portion of a modified construction of one member of the mold;

Fig. 4 is a view similar to that shown in Fig. 3 showing another modification of the structure;

Fig. 5 is a transverse sectional view of a section or portion of a composite plate constituting a portion of the molding face of one member of the mold;

Fig. 6 is a view in transverse section of a modified construction of the member of the mold the face of which is provided with pits or matrices for the formation of trihedral projections upon one side of a plate of glass formed by the said mold, the said member consisting of a block of metal having pits or matrices therein the surfaces of which are covered with a layer of metal which is non-oxidizable by the contact therewith of heated plastic glass;

Fig. 7 is a view in elevation of that side of a reflector provided with trihedral projections, the said reflector being formed by the mold structure illustrated; and Fig. 8 is a transverse sectional view taken on the line 8—8 of Fig. 7.

In the drawings I have shown a mold comprising a bed portion 1 having a recess 2 into which masses of heated plastic glass are adapted to be placed in the process of forming reflectors 3, such as are illustrated in Figs. 7 and 8 of the drawings. The cooperating member 5 of the mold comprises a base portion 6 having a handle member 7, only a portion of which is shown, by means of which the said member 5 may be manipulated either manually or mechanically.

The mold or forming face of the member 5 consists of a composite plate 8 comprising a thin outer layer of metal 9 which is hard and of a character such that it does not oxidize when placed in contact with heated plastic glass and an inner backing or supporting portion of metal 10, which may be of less hardness but of greater toughness than the metal 9. The facing 9 may consist of chromium or other suitable metal non-oxidizable in use, while the backing plate 10 may consist of copper or other suitable metal.

The relatively thin facing of non-oxidizable metal 9 may be formed with the pits or matrices as shown of right triangular pyramidal shape by causing deposition thereof electrolytically upon a corresponding surface formed in any manner, for example, either manually or otherwise in a block of suitable material such as iron, steel, glass or the like. After having been thus formed the strengthening backing 10 is deposited in like manner upon the back or inner side thereof. After the sheet 9 shall have been formed in the manner as above suggested it may be removed, and thereafter the backing 10 deposited thereon, or the latter may be deposited without first removing the former from the matrix or form upon which it was first deposited.

The plate 8 is provided at its opposite edges with a flange 15 which extends at right angles to the general plane of the portion 6 of the member 5 of the mold. The flange 15 terminates at its outer edge in a laterally extending portion 16 which is secured by means of screws 17 to the inner or under side of the portion 6 of the member 5.

It will be noted that the plate 8, even though comprising the face and backing portions 9 and 10, is relatively thin. In consequence it must be suitably supported.

In the construction as shown in Fig. 1 the central or intermediate portion of said plate 8, in which the pits or matrices are formed, is shown in spaced relation to the portion 6. The space thus produced is filled with a filling consisting of suitable material 20, such as Babbitt metal, lead or the like. This filling occupies the recesses or pits formed by the inwardly or rearwardly extending projections or portions 22. The opposite sides of these rearwardly extending projections or portions are hollow to form the right triangular pyramidally shaped pits or matrices 23. It is the presence of these pits which effects the formation of the projections 22.

A plate 30, the middle portion of which is cut away or removed as indicated at 31, is mounted upon the upper side of the base member 1 of the mold. The opening 31 in the plate 30 is of the same shape as, but of less area than the mold recess 2 in the member 1. The plate 30 is mounted within a seat 32 formed by cutting away a portion of the member 1 around the recess 2 therein. A rim portion 33 is secured to the upper side of the outer portion of the plate 30, as shown in Fig. 1. The distance between the inside edges of the rim 33 is substantially less than the distance between the inner edges 31 of the plate 30, as is shown in Fig. 1 of the drawings. The dimensions of the portion 6 of the member 5 are such as to permit the said portion to move in and out of the space between the inner edges of the rim 33, the said movement being toward and from the plate 30 and the mold member 1. The dimensions of the member 8, that is, the distances between the outer surfaces of the opposite sides and ends of the flange 15, are such that the latter is adapted to be moved between but in contact with the edges 31 of the member 30 into and out of the recess 2 of the mold member 1.

When a mass of glass in proper quantity and in plastic form is placed within the recess 2 the mold member 5 may be moved downwardly, as indicated in Fig. 1 of the drawings, and pressed against the said mass to cause it to conform to the mold space formed by the member 5 and the member 1.

Obviously the operation of the mold is to produce a plate of glass having one smooth side and a side having trihedral projections, the surfaces of which are in right angular relation to each other, corresponding to the surfaces of the pits or matrices 23. The said sheet of glass will be provided upon one side adjoining its edges with flanges, the said flanges being formed by the projection of glass into the space 35 formed between the flange 31 of the plate 8 and the adjoining portions of the sides of the recess 2 in the member 1.

In the construction illustrated in Fig. 3 of the drawings the ends of the projections 22 are flattened as shown at 36 and the under or inner side of the part 6 of the mold 5 contacts therewith and supports the plate 8. When thus supported the filling of Babbitt metal, lead or other material between the plate 8 and the part 6 may be omitted.

In Fig. 4 a construction is shown in which the part 6 is in contact with the inner ends of the projections 22 and the space between the said part and the plate 8 is filled with Babbitt metal, lead or other material 37.

In Fig. 6 I have shown a construction in which the part 6' is provided with pits or matrices of the required shape as previously described to the surfaces of which a plating of metal 38, non-oxidizable by the action of heated plastic glass thereon, has been applied. Such application may be made electrolytically or otherwise. The plating 38 may consist of chromium or other suitable metal.

It will be seen that I have provided a mold structure in which the member thereof which is adapted to form the trihedral projections upon one side of a sheet of glass (constituting a central triple reflector) comprises a plate, the molding surface of which consists of a thin sheet of metal non-oxidizable as a result of contact with the plastic heated glass of which the reflector is formed.

The layer of non-oxidizable chromium of the said sheet is relatively thin and in order to strengthen the same it is provided with a backing of less brittle metal, the two sheets of metal being in effect integrally connected. Such connection may be effected as a result of electrolytic action as heretofore explained, or otherwise as may be preferred. The employment of a supporting cushion or backing between the plate 8 and the member 6 as shown in Figs. 1 and 4 of relatively cheap material is desirable because of the saving of expense.

It is of great importance that the molding surface of the plate 8 consists of non-oxidizable metal, thereby rendering the polishing and resurfacing of the pits or matrices 23 unnecessary. The right angular relation of the surfaces of the respective pits to each other as shown renders the polishing and resurfacing thereof difficult and unsatisfactory.

However, the surface of the recess 2 in the member 1 which is wide and smooth and without corners except where the sides thereof are joined in the bottom, may be readily repolished as occasion may require and for that reason the member 1 may consist of iron or steel which is relatively cheap as compared with the non-oxidizable material 9 of the sheet 8, which, as heretofore indicated, may consist of chrome or other suitable metal or of an alloy having proper heat resistance.

It will be understood that my invention may be used in the manufacture of molds for molding glass in which the matrices or molding surfaces are of different form than is shown in the drawings, and as previously described.

Having thus described my invention, what I claim and desire to secure by Letters Patent is:

1. A mold for molding masses of glass into plates, one side of which is provided with trihedral projections to produce triple reflectors, which mold comprises a member including a support, a composite metal sheet secured to and mounted upon said support, the said metal sheet being formed to produce upon its outer side matrices of triangular pyramidal shape, means for connecting said metal sheet to said support, and cushioning means interposed between said plate and the said support.

2. A mold for molding masses of glass ino plates, one side of which is provided with trihedral projections to produce triple reflectors, which comprises a support, a plate consisting of inner and outer sheets united together, the outer of which sheets is not oxidized by the contact therewith of plastic heated glass, the outer edge portions of the said composite sheet terminating in a flange, means for securing said flange to the said support, and reinforcing supporting means interposed between the said sheet and the said support.

3. A mold for molding masses of glass into plates, one side of which is provided with trihedral projections to produce triple reflectors, which member comprises a support, a metal plate consisting of two sheets united together, the outer of which sheets consists of chrome metal and the inner of which consists of a metal of less hardness but of greater toughness, the said plate being formed to provide matrices of right triangular pryamidal shape upon its outer side, means for connecting the outer edge portions of said composite plate to the said support, and reinforcing backing means interposed between the said plate and the said support.

4. A mold for molding masses of glass comprising a member of sheet material having recesses in the molding surface thereof which are of right triangular pyramidal shape, the surfaces of which recesses are covered with a sheet of metal non-oxidizable by the contact therewith of heated plastic glass.

5. A mold for molding yieldable material comprising a support, a sheet of material secured to said support the surface of which is provided with a layer of non-oxidizable metal and reinforcing backing means for said sheet of material.

In testimony that I claim the foregoing as my invention I have hereunto signed my name this 9th day of June, A. D., 1927.

VICTOR L. OESTNAES.